Dec. 19, 1939.  A. T. KOPPE  2,184,221
PLATE HOLDER AND CARRIAGE FOR PHOTOGRAPHIC LETTERING MACHINES
Filed Aug. 14, 1936  5 Sheets-Sheet 1

INVENTOR
ALEXANDER T. KOPPE.
BY
ATTORNEY

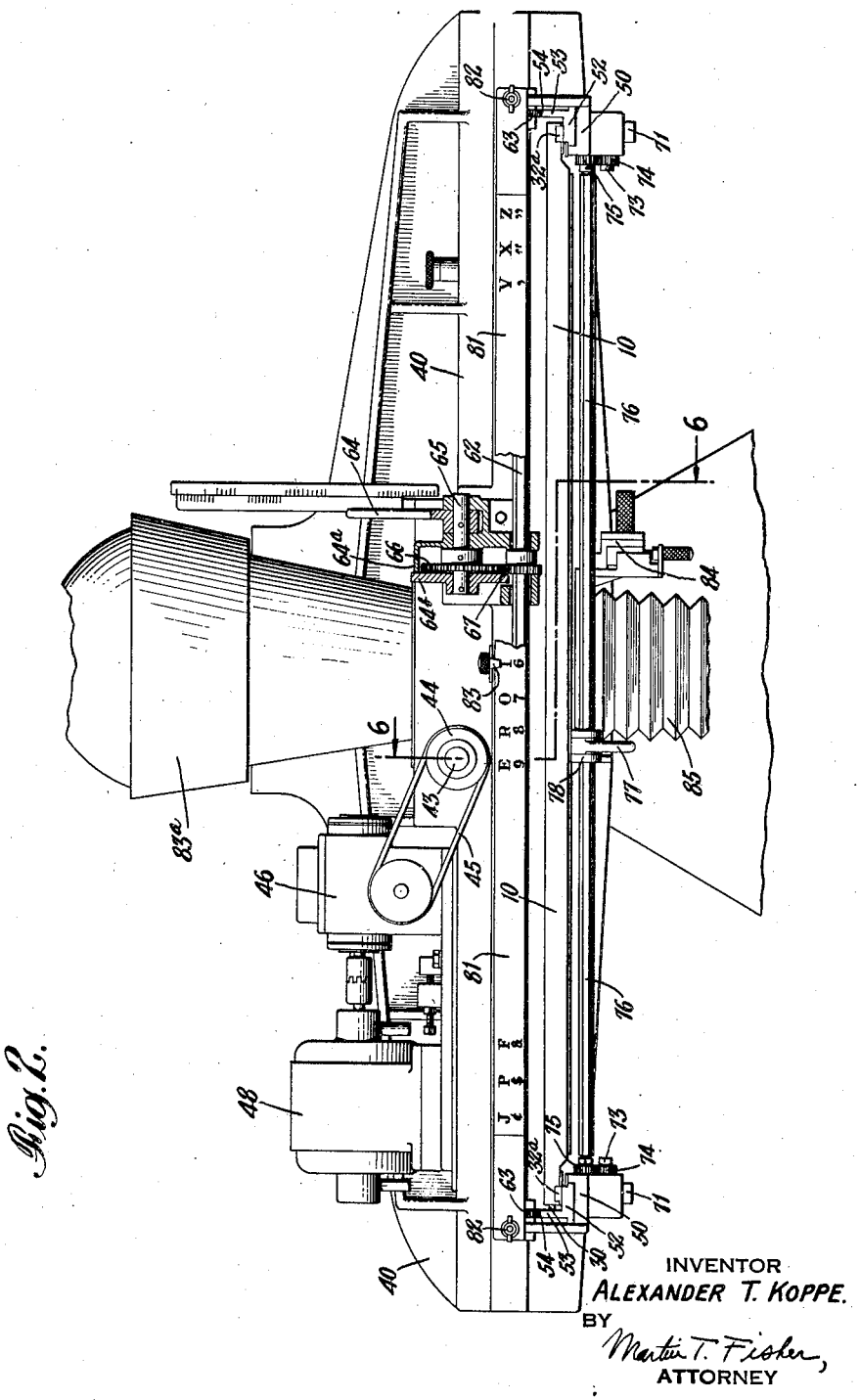

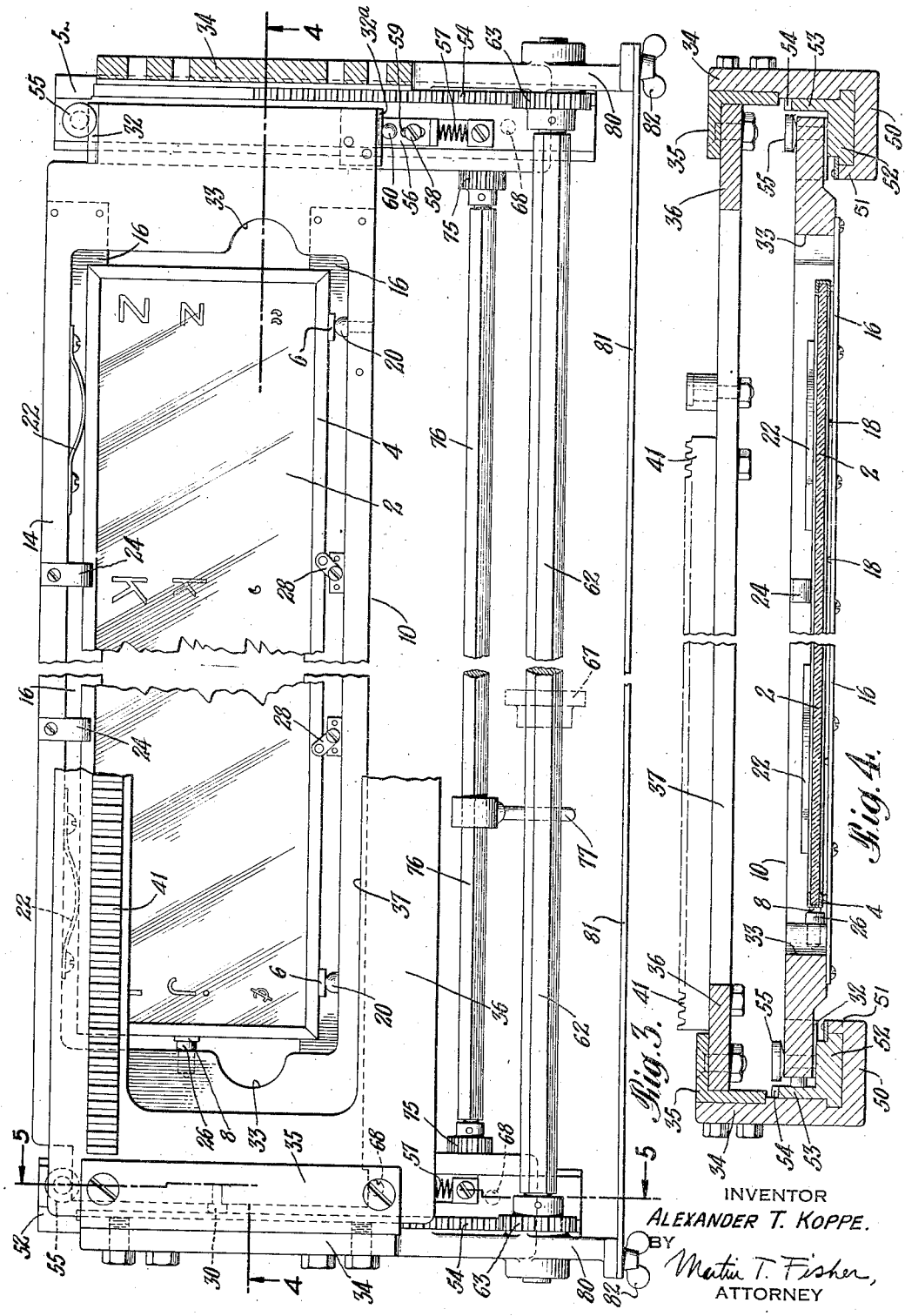

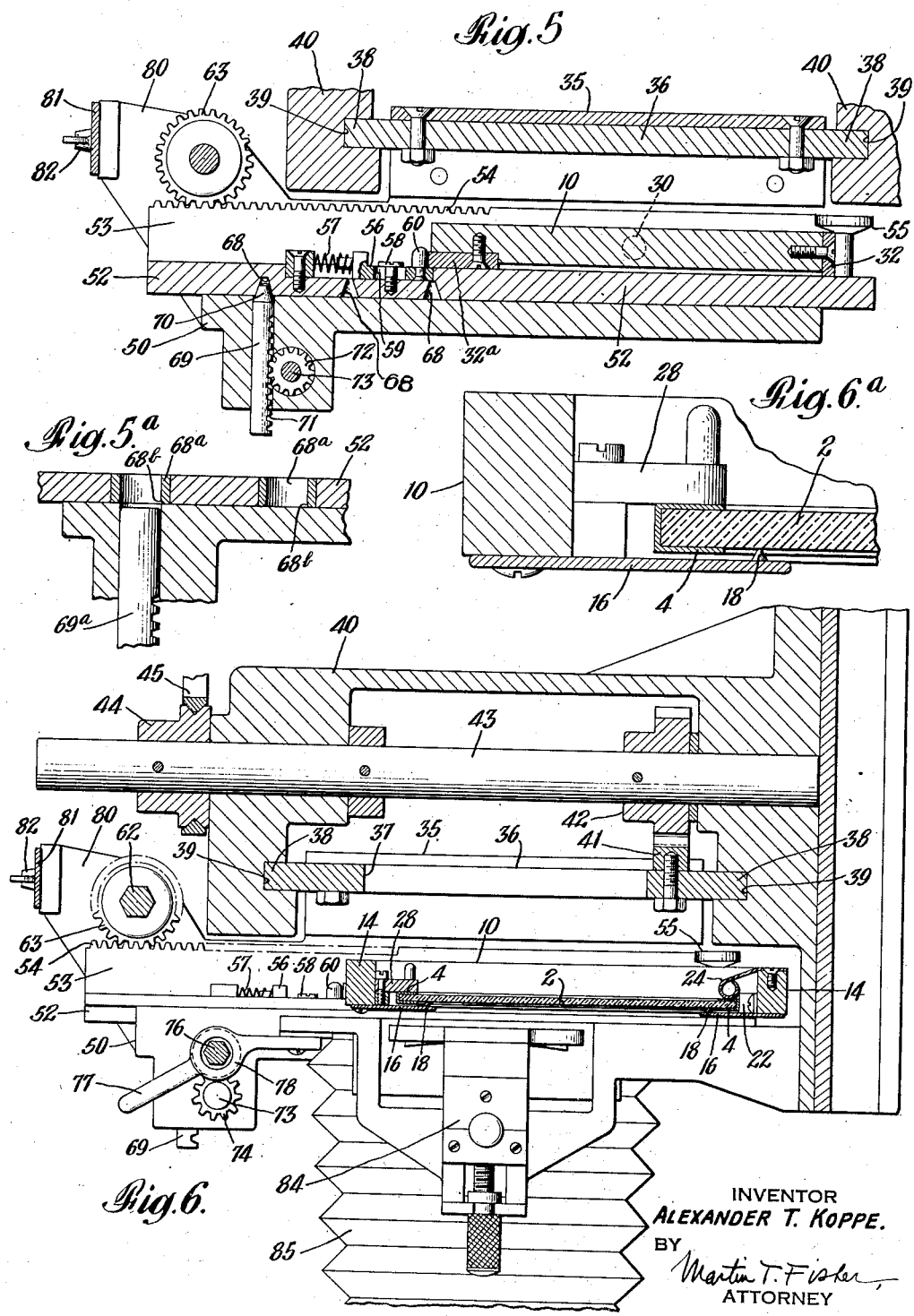

Dec. 19, 1939.     A. T. KOPPE     2,184,221
PLATE HOLDER AND CARRIAGE FOR PHOTOGRAPHIC LETTERING MACHINES
Filed Aug. 14, 1936     5 Sheets-Sheet 5
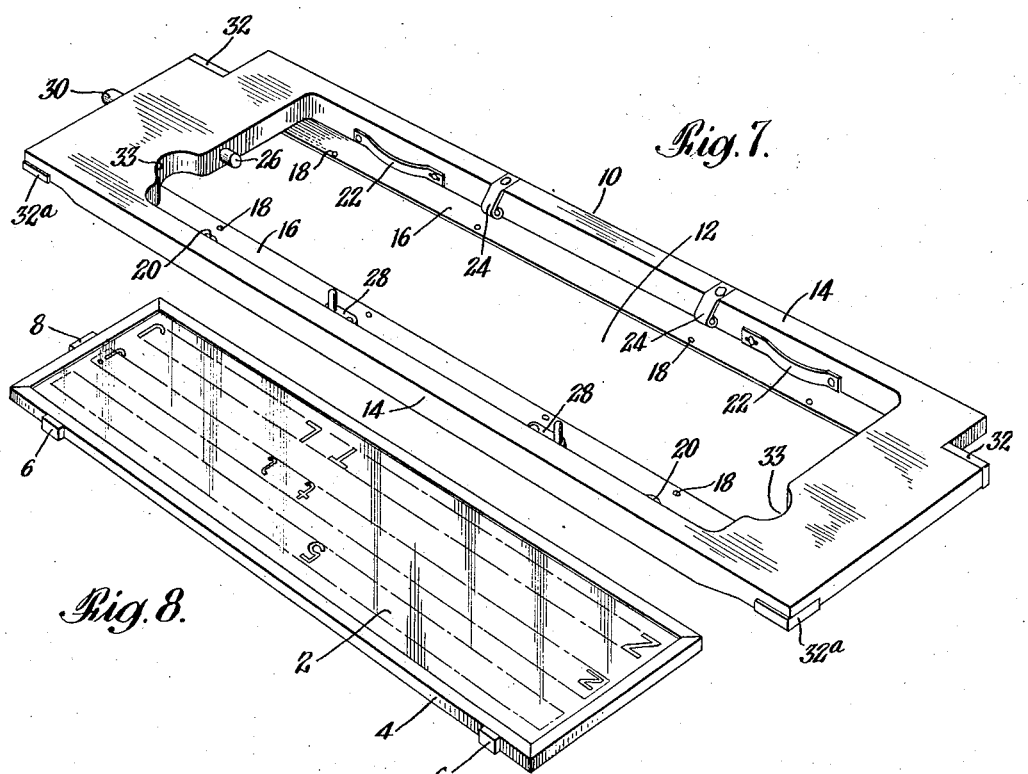
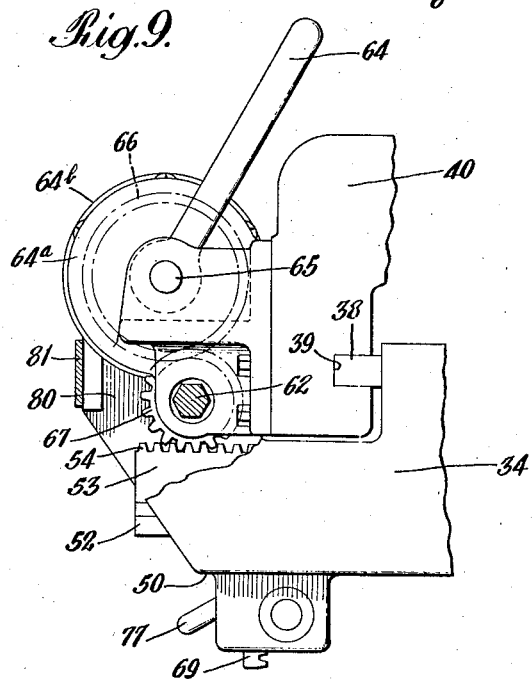
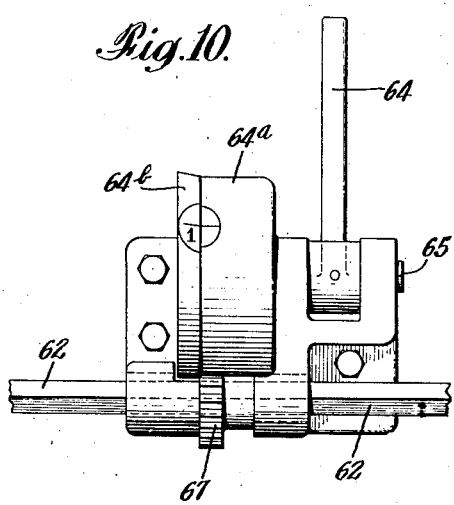
INVENTOR
ALEXANDER T. KOPPE.
BY
Martin T. Fisher,
ATTORNEY Patented Dec. 19, 1939

2,184,221

UNITED STATES PATENT OFFICE 2,184,221

PLATE HOLDER AND CARRIAGE FOR PHOTOGRAPHIC LETTERING MACHINES

Alexander T. Koppe, Hasbrouck Heights, N. J., assignor to General Printing Ink Corporation, New York, N. Y., a corporation of Delaware Application August 14, 1936, Serial No. 96,105

20 Claims. (Cl. 95—4.5)

This invention is a plate holder and carriage for a photographic lettering machine of the general type shown in the patents to Ogden No. 1,893,439, dated January 3, 1933, and No. 2,019,764, dated November 5, 1935.

The present invention comprises the following features:

1. An alphabet plate and an improved frame therefor.
2. An improved type of holder for the alphabet plate, whereby the plate can be positioned therein with great precision.
3. A movable carriage for the alphabet plate holder and controlling means for said carriage, whereby it may be readily moved and positioned in the machine with great precision.

The term "alphabet plate" as used in this specification means a plate provided not only with letters of the alphabet, but with other indicia or characters such as numerals, dollar signs, percentage marks, etc.

In photographic lettering machines of the character here involved, micrometer accuracy in the placement of the alphabet plate is essential. Deviations of the order of one or two thousandths of an inch are serious, because such errors are apt to spoil the precise alignment of the letters. The primary purpose of this invention is to improve the frame for the alphabet plate, the holder for the alphabet plate and the carriage that controls the positioning of the alphabet plate and its holder, so that a letter or character is positioned with great precision, and with micrometer accuracy, and at the same time the machine operated with reasonable rapidity and the plates readily changed.

According to the present invention, the alphabet plate, which is preferably a glass plate with a dark or opaque background and translucent letters and characters, is provided with a metallic frame enclosing its edges and this frame is provided with positioning lugs or blocks, so placed that the dimensions of the plate, plus such blocks, is determinable within one or two thousandths of an inch.

The invention also comprises a holder for the alphabet plate, which is a metallic frame provided with a recess into which the alphabet plate is fitted. This frame is provided with studs, very accurately dimensioned, which are adapted to cooperate with the positioning blocks on the alphabet plate frame, so that when the plate frame is in the holder and the blocks and studs in engagement, the alphabet plate is positioned therein with micrometer accuracy.

Coming now to the third aspect of the invention, the carriage which is adapted to hold the alphabet plate holder in various positions in the machine, this carriage is slidably mounted in the machine and is preferably motor controlled to move back and forth across the machine, that is to say, longitudinally of the alphabet plate, for positioning selected letters or characters in the path of the beam of light.

This carriage, in addition to the movement just described, is provided with means for moving and accurately positioning the alphabet plate in a fore and aft direction, for bringing a new line of characters into operative position. To this end, the carriage is provided with a transversely slidable plate-holder-receiver or carrier, and one of the important features of the invention is that this plate-holder-receiver is provided with positioning means which come into final engagement only when the plate is properly positioned with micrometer accuracy for a particular line.

The general features of the invention having been thus outlined, further details and further advantages will be apparent from the accompanying drawings illustrating in detail the present preferred embodiments of the several features of the invention.

In these drawings:

Fig. 2 is a fragmentary front view of the same;

Fig. 3 is a plan view of the slidable carriage, partly broken away;

Fig. 4 is a section on the line 4—4 of Fig. 3;

Fig. 5 is a section on the line 5—5 of Fig. 3;

Fig. 5a is a fragmentary sectional view showing means for accurately positioning the slide for the plate holder.

Fig. 6 is a section on the line 6—6 of Fig. 2;

Fig. 6a is a fragmentary sectional view, on an enlarged scale, of a detail of Fig. 6.

Fig. 7 is a perspective view of the plate holder;

Fig. 8 is a perspective view of the alphabet plate;

Fig. 9 is a partial end view, with parts broken away, to show certain details of the line selecting device; and Fig. 10 is a front elevation of the line selecting device and its drive shaft.

Figure 1:
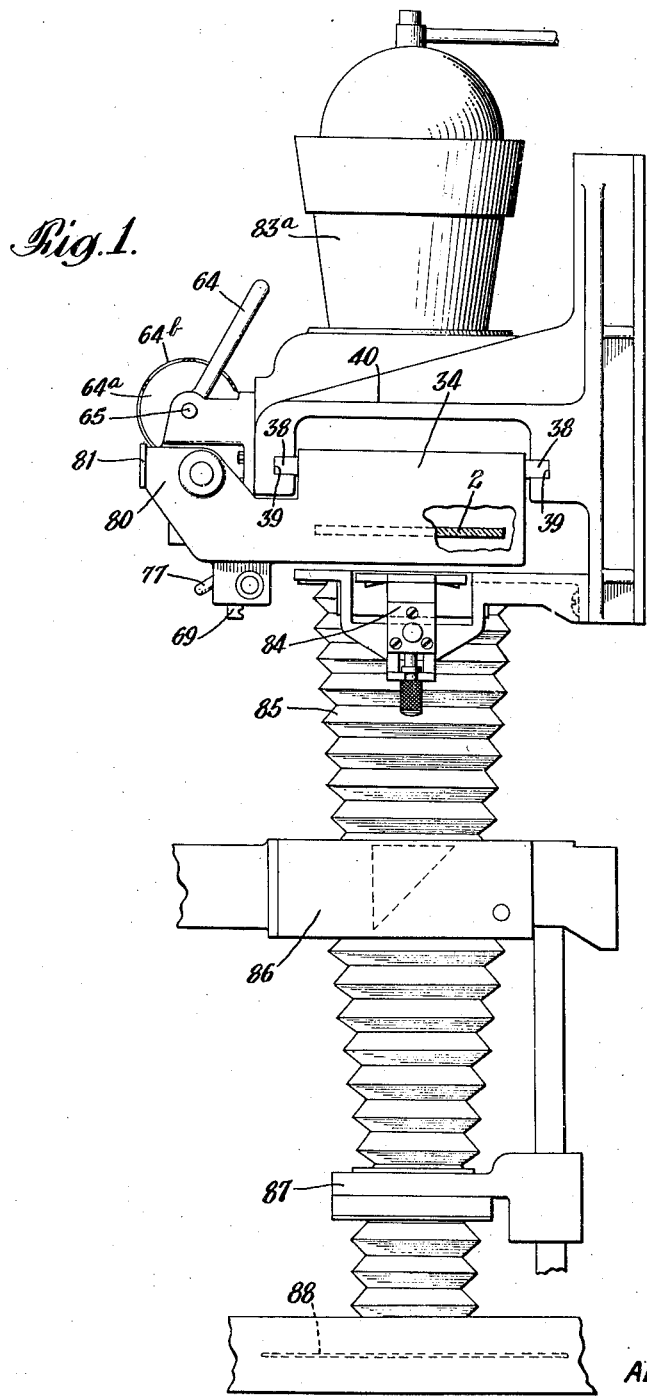
Fig. 1 is a side view of a part of a photographic lettering machine, including the features of the present invention.

Referring first to Figs. 7 and 8, 2 is an alphabet or character plate, made of glass, provided with several lines of letters and other indicia in transparent or translucent letters on a dark or opaque background. This plate is provided with a metallic frame 4, substantially U-shaped in cross section, enclosing all four edges of the plate. The frame 4 is provided along one side with a plurality of positioning blocks 6, which are very accurately machined, so that the distance from the outside of one of the blocks to the opposite side of the frame is known within a few thousandths of an inch.

One end of the frame is provided with a positioning block 8, also of accurately predetermined thickness.

The alphabet plate is positionable in a plate holder 10 which is provided with a central opening 12, bordered by side members 14 and inset shoulders 16, the latter provided with studs 18, for receiving the alphabet plate. On one side, the side portions 14 are provided with accurately dimensioned studs 20 and on the other side with springs 22 and resilient clamps 24. One end of the holder 10 is provided with a stud 26, accurately dimensioned.

When the plate 2 and frame 4 are in position in the plate holder 10, as more particularly shown in Fig. 3, the springs 22 press the frame 4 laterally and the clamps 24 press the frame downwardly against the studs 18 on shoulders 16. The studs 18 are accurately made and have the important function of precisely positioning the alphabet plate, necessary when a predetermined focus is used. The underside of plate 2 is the film or letter carying side, and the studs 18 enable this side to be positioned with great precision in a vertical plane even though the glass varies in thickness.

The frame is pressed manually to the left so that the block 8 engages against stud 26 and then the plate is clamped in the position described by means of pivoted clamps 28, carried by shoulders 16 which swing over and firmly engage the upper edge of the frame, as shown more particularly in Fig. 3.

The plate holder 10 is provided at one end with a positioning stud 30 and is also provided near the two rear corners with cut-outs forming shoulders on which are positioned accurately dimensioned blocks 32. The two other corners are provided with accurately dimensioned bearing blocks 32a. The plate holder 10 is also provided with cut-outs 33 for the fingers, for convenience in placing and removing the alphabet plate.

The carriage for receiving and positioning the plate holder of Fig. 7 will now be described, referring more particularly to Figs. 3 to 6. This carriage comprises frame members 34, extending fore and aft at either side of the machine, provided with brackets 35 for supporting a heavy plate 36, which is provided with a central opening 37. Plate 36 is extended forwardly and backwardly to form slide rails 38, which rails engage in grooved guideways 39 formed in the casting 40 of the main machine frame.

The plate 36 of the carriage is also provided with a gear rack 41 which meshes with a gear 42 secured on a shaft 43 rotatably mounted in the casting 40, this shaft being driven by a pulley wheel 44 and belt 45 from a reduction gear box 46, which can be driven in either direction by a multi-speed, manually controlled reversible motor 48 directly connected thereto. As the motor is driven, in either direction, it will be apparent that the carriage is moved longitudinally of itself and to the right or left of the operator, when he is facing the front of the machine, as in Fig. 2, and different letters on the alphabet plate thereby brought into proper focal position and thereafter successively photographed, as is well understood in machines of this character.

Continuing with the description of the carriage, the castings 34 at the ends of the carriage are provided with laterally and inwardly extending portions 50, formed with upwardly extending flanges 51 to provide a slide-way or guide-way extending transversely of the longitudinal axis of the alphabet plate and, therefore, fore and aft of the machine. Slidable in these guide-ways 50 are two carriers 52 for the plate carrier 10, these carriers 52 being provided with outwardly disposed end walls 53, the upper edges of which are formed into gear racks 54.

The plate-holder-receiver or carrier 52 is provided with vertical studs 55, very accurately positioned, against the heads of which the plate holder bears when in operative position.

In order quickly and accurately to position plate holder 10 against the studs 55, carrier 52 is provided at each end with a slide 56 which is spring pressed rearwardly, that is to the right Fig. 5 against stud 55 by a spring 57, limited sliding movement being provided by a pin 58 working in the slot 59. Each slide is provided with a very accurately dimensioned stud 60 which is adapted to bear against the block 32a on the plate holder. In positioning the plate holder on the carrier 52, the blocks 32 are pressed against the studs 55 and the plate then lowered onto studs 60, which yield to the front, that is to the left of Fig. 5 and when the holder is in position springs 57 exert pressure on the studs 60 for accurately and firmly holding the plate holder against the studs 55. When so positioned, the stud 30 on the plate holder bears against the left hand wall 53.

In order to operate the carrier 52, there is provided an angular shaft 62, square or hexagonal, for example, extending across the machine. This shaft moves with the carrier and is provided with gears 63 engageable with the racks 54. Shaft 62 is manually controlled by a handle 64 connected to a shaft 65 to which is secured a gear 66 meshing with a gear 67, this latter gear 67 having an angular opening through which the shaft 62 can slide as the plate carrying carriage moves to the right or left. It is evident that operation of the handle 64 will turn shaft 62 and thus move carrier 52, the plate holder 10 and the alphabet plate carried therein, in a direction fore and aft with respect to an operator facing the front of a machine, as in Fig. 2.

In order to indicate to the operator what position the alphabet plate is in, there is provided a fixed and calibrated member 64a, alongside of which is a rotatable member 64b, fixed on shaft 65 and turnable with the handle 64. The calibrations indicate what line of characters is in operative position and show whether they are approximately accurately positioned.

The handle 64 and cooperating mechanism just described will give an approximate setting of the carrier slide 52. In order to give the micrometric or very accurate setting necessary, and to lock the carrier and plate in set position, the slide 52 and the portions 50 are provided with some type of interengaging elements which interengage and lock with the slide 52 only when it is positioned with micrometer accuracy. To this end, member 52 see Fig. 5 is provided in its under side with a plurality of tapered sockets 68, very accurately made. Adapted to engage in the sockets is a plunger 69 provided with a tapered head 70.

When a line of characters on the alphabet plate is approximately positioned, by means of handle 64, the plunger 70 is raised and, due to the tapered construction of the head of the plunger and the sockets the carrier 52 will be moved so that the plunger is centered with respect to the sockets, in which position the alphabet plate is positioned with an accuracy of the order of one-thousandth of an inch.

An alternative and preferred construction of the plungers and sockets is shown in Fig. 5a. In this figure, the slide 52 is provided with a plurality of accurately dimensioned bushings 68a, located in suitable holes in the carrier, the bushings being provided with downwardly opening bell mouths 68b. A plunger 69a is provided as before, the upper end of which is chamfered as shown so as to enter freely into the bushings, for very accurately positioning the slide 52. This also positions the slide with an accuracy of the order of one-thousandth of an inch.

The plungers 69 or 69a are preferably provided in duplicate, one on each side of the machine, and each plunger is provided with a gear rack 71 engageable with a gear 72 on a shaft 73 on which is mounted a gear 74 meshing with a gear 75 on an angular shaft 76 extending transversely of the machine. The shaft 76 moves with the carriage and slidably engages with an angular opening in a handle 77 mounted in bearing member 78.

As the carriage moves to the right or left, Fig. 2, the angular shaft 76 slides through the handle 77, but in any position that the carriage may assume it is evident that the locking plungers 69 or 69a can be engaged or disengaged by means of the handle 77 controlled by the operator.

The end castings 34 are each provided with an extension 80 on which is mounted a letter bar 81, which moves back and forth with the carriage. This bar carries the same type of letters as on the alphabet plate and may be readily changed through the medium of wing nuts 82 as the alphabet plates are changed. A pointer 83 fixed on the machine indicates what letter or character is in operative position in the light path.

Cooperating with the foregoing features is a light-housing 83a which projects a beam of light through a selected letter on the alphabet plate 2, thence through an enlarging or reducing lens mounted in a holder 84, which is vertically adjustable. This lens holder and its structure and operation are described and claimed in the co-pending application of Harold A. Horman, filed August 14, 1936, Serial No. 96,110. The beam of light then passes through bellows 85, prism casing 86 and lens and shutter housing 87 to project the image onto a light sensitive surface 88, as is well understood in this art.

With the present invention the alphabet plate provided with its frame 4 may be positioned with great precision in its holder 10 and this holder in turn be positioned with great precision on the fore and aft slides 52 of the longitudinally slidable guide-way 36, by pushing it against the studs 55 so that the spring pressed studs 60 hold it accurately in place.

In order to bring a new line of letters into operative position, the handle 77 is moved to unlock the plungers 69 or 69a and then the handle 64 is moved to operate the slide 52 to bring a new line of letters into approximately the right position. Then the handle 77 is moved to raise the plungers to locking position and, if the plate should not be in exactly the right position, the pins 69 or 69a draw it to the right position and lock it there. This feature is of particular importance in the present invention.

The entire carriage is moved back and forth by means of electric buttons, controlling circuits to the motor 48 to operate it at fast or slow speeds in either direction. The control of the motor forms no part of the present invention.

The plate holder 10 can be very quickly removed simply by the operator reaching in and grasping the front edge thereof and lifting it out of engagement with the studs 60.

While I have described the preferred embodiments of my invention in some detail, it should be understood that the invention is not limited to the particular details here described, but may be carried out in other ways as falling within the scope of the claims.

I claim as my invention:

1. In a photographic lettering machine, in combination, a longitudinally movable carriage for an alphabet plate, said carriage being provided with transversely movable carriers for supporting an alphabet-plate-holder receiving means, means for moving said carriers, and interengageable stud and socket devices carried at both ends of the carriage and at both ends of the carriers, for moving the carriers to, and locking them in, a definite predetermined position, and manually operated means extending lengthwise of the carriage for simultaneously operating said stud and socket devices.

2. In a photographic lettering machine, in combination, a longitudinally movable carriage for an alphabet plate, said carriage being provided with transversely movable carrier for supporting an alphabet-plate-holder receiving means, means for moving said carriers, an interengageable stud and socket devices carried at both ends of the carriage and at both ends of the carriers, for moving the carriers to, and locking them in, a definite predetermined position, and manually operated means comprising a shaft extending lengthwise of the carriage and gear means controlled by said shaft, for simultaneously engaging and disengaging said stud and socket elements.

3. In a photographic lettering machine, in combination with a suitable support, a carriage for the holder of an alphabet plate, motor driven means for moving the carriage longitudinally, manually operated slide means for supporting and moving the alphabet plate holder forwardly and backwardly, interengaging means carried by both ends of said carriage, and by said slide means which engage only when the slide means is precisely positioned, for accurately positioning and holding said slide means and alphabet plate holder carried thereby in a definite, predetermined fore and aft position, and manually operated means for simultaneously operating said interengaging means.

4. In a photographic lettering machine, in combination with a suitable support, a carriage for the holder of an alphabet plate, motor driven means for moving the carriage longitudinally, manually operated slide means for supporting and moving the alphabet plate holder forwardly and backwardly, interengaging stud and socket means carried by both ends of said carriage, and by said slide means which engage only when the slide means is precisely positioned, for accurately positioning and holding said slide means and alphabet plate holder carried thereby in a definite, predetermined fore and aft position, and manually operated means comprising a shaft extending across the front of the machine, and gear means controlled by said shaft, for operating said stud and socket means.

5. A plate holder for the plate of a photographic lettering machine, comprising an open frame provided with supporting shoulders, said shoulders being provided with means located within the perimeter of and projecting toward one face of the alphabet plate, for engaging and supporting an alphabet plate, whereby the plane of the underside of the alphabet plate is accurately fixed.

6. A plate holder for the plate of a photographic lettering machine, comprising an open frame provided with supporting shoulders, said shoulders being provided with upwardly extending, accurately dimensioned studs located within the perimeter of and projecting toward one face of the alphabet plate and adapted to engage one face of and to support the alphabet plate, for accurately fixing the plane of the alphabet plate.

7. A plate holder for the plate of a photographic lettering machine, comprising an open frame provided with inwardly extending, accurately dimensioned blocks for engagement with the frame of the alphabet plate for accurately positioning said plate in a horizontal plane, said frame being also provided with positioning studs located within the perimeter of and projecting toward one face of the alphabet plate and adapted to engage the alphabet plate for accurately positioning it in a vertical plane.

8. In a photographic lettering machine, in combination, a longitudinally movable carriage, guideways carried by said carriage and extending transversely with respect to the path of movement of the carriage, slide means for carrying an alphabet plate positioned in said guideways for movement therein, a plurality of sockets in said slide means, and plunger means carried by the guideways and engageable in certain of said sockets for positioning said slide means in a plurality of predetermined transverse positions.

9. In a photographic lettering machine, in combination, an alphabet plate holder, accurately dimensioned bearing blocks on said holder, a longitudinally movable carriage, guideways carried by said carriage and extending transversely with respect to the path of movement of the carriage, slide means for carrying said alphabet plate holder, positioned in said guideways for movement therein, and positioning studs carried by said slide means, for engagement with the said bearing blocks on the plate holder.

10. In a photographic lettering machine, in combination, an alphabet plate holder, accurately dimensioned bearing blocks on said holder, a longitudinally movable carriage, guideways carried by said carriage and extending transversely with respect to the path of movement of the carriage, slide means for carrying said alphabet plate holder, positioned in said guideways for movement therein, and positioning studs, certain of which are spring pressed toward an opposite stud, carried by said slide means, for engagement with the said bearing blocks on the plate holder.

11. In a photographic lettering machine, in combination, an alphabet plate holder provided with inset shoulders, accurately dimensioned bearing blocks positioned on said inset shoulders, a longitudinally movable carriage, guideways carried by said carriage and extending transversely with respect to the path of movement of the carriage, slide means for carrying said alphabet plate holder, positioned in said guideways for movement therein, and positioning studs carried by said slide means, for engagement with the said bearing blocks on the plate holder.

12. In a photographic lettering machine, in combination, an alphabet plate holder, accurately dimensioned bearing blocks on said holder, said holder having a large central opening therein, accurately dimensioned positioning studs at an inner edge of said frame adapted to bear against an edge of the alphabet plate, spring means for forcing the alphabet plate against said positioning studs, a longitudinally movable carriage, guideways carried by said carriage and extending transversely with respect to the path of movement of the carriage, slide means for carrying said alphabet plate holder, positioned in said guideways for movement therein, and positioning studs carried by said slide means, for engagement with the said bearing blocks on the plate holder.

13. In a photographic lettering machine, in combination, an alphabet plate holder, accurately dimensioned bearing blocks on said holder, said holder having a large central opening therein, shoulders projecting into said central opening, for supporting an alphabet plate, accurately dimensioned positioning studs at an inner edge of said frame adapted to bear against an edge of the alphabet plate, spring means for forcing the alphabet plate against said positioning studs, means for holding the alphabet plate securely against said supporting shoulders, a longitudinally movable carriage, guideways carried by said carriage and extending transversely with respect to the path of movement of the carriage, slide means for carrying said alphabet plate holder, positioned in said guideways for movement therein, and positioning studs carried by said slide means, for engagement with the said bearing blocks on the plate holder.

14. A plate holder for the character plate of a photographic lettering machine, comprising a rigid, open frame provided with shoulders extending part way into the opening in the frame, for engaging and supporting said character plate, positioning studs located on the inner edge of the opening in the frame, spring means for pressing the plate against said studs, and means, acting in a direction transverse to the action of said spring means, for pressing the plate against said shoulders.

15. A plate holder for the character plate of a photographic lettering machine, comprising a rigid, open frame provided with shoulders extending part way into the opening in the frame, for engaging and supporting said character plate, positioning studs located on the inner edge of the opening in the frame, spring means for pressing the plate against said studs, and spring means, acting in a direction transverse to the action of said first mentioned spring means, for pressing the plate against said shoulders.

16. A plate holder for the character plate of a photographic lettering machine, comprising a rigid, open frame provided with shoulders extending part way into the opening in the frame, for engaging and supporting said character plate, positioning studs located on the inner edge of the opening in the frame, springs means for pressing the plate against said studs, and manually operated clamping means, acting in a direction transverse to the action of said spring means, for pressing the plate against said shoulders.

17. A plate holder for the character plate of a photographic lettering machine, comprising a rigid open frame provided with shoulders extending part way into the opening in the frame, positioning studs projecting from the inner edge of the opening in the frame, spring means for pressing the plate against said studs, and additional studs carried by said shoulders and projecting in a direction at right angles to the plane of the alphabet plate, for positioning the plate accurately in a particular plane.

18. A plate holder for the character plate of a photographic lettering machine, comprising a rigid, open frame provided with shoulders extending part way into the opening in the frame, positioning studs projecting from the inner edge of the opening in the frame, spring means for pressing the plate against said studs, additional studs carried by said shoulders and projecting in a direction at right angles to the plane of the alphabet plate, for positioning the plate accurately in a particular plane, and additional means for holding the plate against said last mentioned studs.

19. In a photographic lettering machine, a carriage, means for moving said carriage longitudinally of itself, a plate carrier on the carriage, movable therewith and slidable transversely thereof, means for moving said plate carrier for positioning the alphabet plate carried thereby in approximately the right transverse position, and additional means, comprising accurately dimensioned, interengaging plunger and socket devices, certain of which are carried by the carriage and others of which are carried by the plate carrier, said devices being located at both ends of the carriage and plate carrier for moving the carriage to, and locking it in, exactly the right transverse position, with micrometer accuracy.

20. In a photographic lettering machine, in combination, a carriage, means for moving said carriage back and forth across the machine, a plate carrier for supporting an alphabet plate, mounted on the carriage and movable therewith and slidable transversely thereof, means for moving said plate carrier for positioning the plate carried thereby in approximately the right transverse position, additional accurately dimensioned means for positioning the plate carrier in exactly the right transverse position, with micrometer accuracy, said additional means comprising interengaging plunger and socket devices, certain of which devices are carried by the carriage and others by the slideway, said devices being located at both ends of the carriage and plate carrier, and means for operating said plunger and socket devices simultaneously.

ALEXANDER T. KOPPE.